United States Patent
Wolfgang et al.

(10) Patent No.: US 6,625,295 B1
(45) Date of Patent: Sep. 23, 2003

(54) AUTHENTICATION OF SIGNALS USING WATERMARKS

(75) Inventors: Raymond B. Wolfgang, Exton, PA (US); Edward J. Delp, III, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 0 days.

(21) Appl. No.: 09/011,213

(22) PCT Filed: Sep. 12, 1997

(86) PCT No.: PCT/US97/16237
§ 371 (c)(1),
(2), (4) Date: Mar. 8, 1999

(87) PCT Pub. No.: WO98/11492
PCT Pub. Date: Mar. 19, 1998

Related U.S. Application Data

(60) Provisional application No. 60/037,182, filed on Feb. 3, 1997, and provisional application No. 60/025,589, filed on Sep. 13, 1996.

(51) Int. Cl.[7] .................................................. G06R 9/00
(52) U.S. Cl. ........................................ 382/100; 713/176
(58) Field of Search ......................... 382/100; 380/54; 386/94; 713/176; 700/94; 709/219; 358/1.9; 283/82

(56) References Cited

U.S. PATENT DOCUMENTS

| | | | | | |
|---|---|---|---|---|---|
| 5,659,726 | A | * | 8/1997 | Sandford et al. | 707/101 |
| 5,822,436 | A | * | 10/1998 | Rhoads | 380/54 |
| 5,875,249 | A | * | 2/1999 | Mintzer et al. | 380/54 |
| 6,069,914 | A | * | 5/2000 | Cox | 375/150 |
| 6,094,722 | A | * | 7/2000 | Astola et al. | 713/176 |
| 6,493,457 | B1 | * | 12/2002 | Quackenbush et al. | 382/100 |
| 2002/0029338 | A1 | * | 3/2002 | Bloom et al. | 713/176 |

OTHER PUBLICATIONS

Boland, Watermarking digital images for copyritght protection, 1995, IEEE, Pges 325–330.*

Van Schyndet et al, A digital watermark, 1994, IEEE, pp. 86–90.*

* cited by examiner

Primary Examiner—Bhavesh M. Mehta
Assistant Examiner—Barry Choobin
(74) Attorney, Agent, or Firm—Barnes & Thornburg

(57) ABSTRACT

A method of determining if at least a portion of a suspect signal (58) is derived from a watermarked original signal (56) includes the steps of providing a watermark (50) and creating the watermarked original signal (56) by incorporating the watermark (50) onto an original signal (52). At least one first watermark indicator is generated (64) based on the the watermarked original signal (56) and the watermark (50) and at least one second watermark indicator is generated (62) based on the suspect signal (58) and the watermark (50). A determination is made (66, 68, 70) whether at least a portion of the suspect signal (58) is derived from the watermarked original signal (56) is made based on the at least one first watermark indicator (64) and the at least one second watermark indicator (62).

38 Claims, 6 Drawing Sheets

AUTHENTICATION OF SIGNALS USING WATERMARKS

CROSS-REFERENCE TO RELATED APPLICATIONS

This application is a U.S. national application of international application serial No. PCT/US97/16237 filed Sep. 12, 1997, which claims priority to U.S. Serial Nos. 60/025,589 and 60/037,182 filed Sep. 13, 1996, and Feb. 3, 1997, respectively.

FIELD OF THE INVENTION

The present invention relates to methods and apparatus for protecting and authenticating information, and particularly to protecting and authenticating information using watermarks. More particularly, the present invention relates to methods and apparatus that determine whether a suspect signal is derived from a watermarked original signal by analyzing the suspect signal for the presence of a known watermark.

BACKGROUND AND SUMMARY OF THE INVENTION

The growth of the Internet and networked multimedia systems has magnified the need for copyright protection of information, including image data. Copyright owners need tools for identification content authentication, that is, identification of copies of the protected work that may have been forged, filtered, or otherwise modified, as well as ownership authentication. It may also be necessary to determine a work's chain of custody and to verify who viewed or altered the work, including when such actions occurred.

Three techniques for protecting information are encryption, authentication, and time stamps. Encryption disguises the content of information so that only users who possess the decryption "key" can convert the encrypted data back to its original form. Without the key, it is computationally infeasible to derive the original data. Another technique is authentication, which does not hide the content of the data but rather guarantees who created it. Time stamps can identify both the time at which the work was generated and the work's owner. All three techniques may be used in various combinations.

Authentication techniques for protecting information can use what is known as a watermark. A watermark can take many forms, such as a change in the thickness of the paper on which information appears or some other physical characteristic of the medium carrying the information, or it can be included as part of the information on the medium. Typical examples are the watermarks included on checks or paper money, which aid in authenticating the item and preventing its forgery. In essence, a watermark is a code or image incorporated onto the carrier of the original information, and can be either visually perceptible or imperceptible.

A typical authentication technique using watermarks includes three parts: the watermark, the marking of the original information and the verification of the presence of the watermark in suspect information that may be copied or derived from the watermarked original information. A marking algorithm incorporates the watermark onto the image and a verification algorithm authenticates the information by determining the presence of the watermark, thereby determining both its owner and integrity. Although watermarks are traditionally associated with information such as printed items or images, they are similarly useful for other forms of information such as audio and video, including digital versions of these types of information.

Incorporating a watermark into visually perceptible information is a known method for preventing forgery and determining authenticity of data. For example, U.S. Pat. No. 5,607,188 to Bahns et al. discloses techniques for marking optical data discs with a watermark for purposes of visual identification and verification of authenticity. Similarly, U.S. Pat. No. 5,530,759 to Braudaway et al. discloses a system for placing a visible watermark on a digital image. There are reasons why it is often desirable, however, to include a watermark that is visually imperceptible, for example so that an image retains its aesthetic and commercial value or if the watermark contains information specifically intended to be invisible. U.S. Pat. No. 5,568,570 to Rabbani, U.S. Pat. No. 5,606,609 to Houser et al., and U.S. Pat. No. 5,636,292 to Rhoads are examples of patents that discuss methods and apparatus for incorporating electronic signatures or watermarks into digital data without affecting the visual quality of the information.

In addition to the increase in access to copyrighted information and ease of copying in the multimedia and Internet environments, visual information is routinely subjected to linear and nonlinear filtering, such as JPEG and MPEG compression. Accordingly, authentication techniques using watermarks to protect information effectively in these environments must withstand and survive the various transformations that information can be subjected to, such as degradation of the resolution of the signal or introduction of random errors or noise. The technique should similarly survive conversion between physical media such as through printing and optical scanning.

An effective authentication technique using watermarks should further be resistant to attempts to defeat the protection, for example by the addition of noise or another watermark to the information, or by attempts to remove the watermark from the signal. The technique should furthermore be independent of the nature of the information being protected, that is, it should apply to various types of information such as image, video, and audio signals, as well as to various formats and resolutions of the data. Thus, the technique should be able to authenticate information by detecting the presence of a known watermark in, for example, a JPEG or GIF image file as well as in an MPEG video file. For example, a watermark incorporated onto a GIF image should discernable after transformation into a JPEG image or MPEG video.

By embedding a watermark that is essentially random onto information, it is infeasible to decipher or remove the watermark without degradation of the information that is watermarked, thus providing robust protection for owners. An additional beneficial feature of a watermark based authentication technique, however, would be the ability to encode non-random information into the watermarked signal, such as time stamps, signatures, and the like, that nevertheless appears substantially random to provide robust protection for copyright owners.

According to one aspect of the present invention, a method of determining if a suspect signal is derived from a watermarked original signal is provided by the present invention. A watermark is supplied and the watermarked original signal is created by incorporating the watermark onto an original signal. At least one first watermark indicator is generated based on the watermarked original signal and the watermark. At least one second watermark indicator is generated based on the suspect signal and the watermark. Finally, a determination whether the suspect signal is derived from the watermarked original signal is made based on the at least one first and second watermark indicators. In illustrative embodiments, the original and suspect signals can be digital images, digital audio signals, or digital video signals, and the watermark is visually imperceptible after incorporation onto the original signal.

In illustrative embodiments, the watermark incorporated onto the original signal can be substantially random, for example generated based on an m-sequence. The values of the watermark can be either unipolar, for example, either zero or one, or bipolar, for example, either one or negative one. The watermark can be generated from an m-sequence having a length greater than the length of the signal onto which the watermark is incorporated, and the watermark can be generated from non-adjacent sections of the m-sequence.

In an illustrative embodiment, the original signal is a digital image that includes a plurality of planes and the watermark is incorporated onto at least one of the planes. In another embodiment a separate watermark is provided for each plane of the image. The watermark for each successive plane of the image can be generated based on a previous watermark, for example, the successive watermarks can be encrypted versions of their predecessor watermarks. In yet another embodiment the watermark can have portions that correspond to each of the planes, for example portions of the watermark can be incorporated onto one of three planes of the image based on a tripolar sequence, such as a random sequence having three values that each correspond to one of the image planes.

In another illustrative embodiment the determination of whether the suspect signal is derived from the watermarked original signal is made by determining if only a portion of the suspect signal is derived from a portion of the watermarked original signal. The first watermark indicator is based on comparing at least a portion of the watermarked original signal to a corresponding portion of the watermark, and the second watermark indicator is based on comparing at least a portion of the suspect signal to a corresponding portion of the watermark. The step of generating the first watermark indicator can include computing at least one cross-correlation value based on a portion of the watermarked original signal and a portion of the watermark and the step of generating the second watermark indicator can include computing at least one cross-correlation value based on a portion of the suspect signal and a corresponding portion of the watermark. The difference between the cross-correlation value based on the watermarked original signal and the cross-correlation value based on the suspect signal is compared to a threshold. The threshold can be based on the size of the portion of the watermarked original signal used in computing the cross-correlation value.

According to another aspect of the invention, a degree of authenticity of the suspect signal is determined based on the at least one first and second watermark indicators.

In yet another embodiment the original signal and suspect signal are arrays of pixel values and each of the arrays includes a plurality of sub-arrays. A first watermark indicator is generated by computing a plurality of cross-correlation values based on the sub-arrays of pixel values of the watermarked original signal and the watermark, and the second watermark indicator is generated by computing a plurality of cross-correlation, values based on the sub-arrays of pixel values of the suspect signal and the watermark. The determination of whether the suspect signal is derived from the watermarked original signal includes subtracting one of the second plurality of cross-correlation values from one of the first plurality of cross-correlation values and comparing the difference to a threshold. The threshold can be based on the number of values used to compute the cross-correlation values.

In still yet other embodiments the suspect signal is generated by digitizing an original suspect signal, for example by scanning a suspect image. The original signal itself can be generated based on another signal, for example by digitizing an image, video, or audio, or by filtering another digital signal. The watermark can include a first portion having a first range of values, e.g., $\{-1,1\}$, and a second portion having a second range of values, e.g., $\{0,1\}$.

In other embodiments a watermark that exists within the original signal is derived so that the original signal is the same as the watermarked original signal. A value is provided, and locations within the original signal that represent the value are determined. The watermark existing in the original signal is derived from the determined locations. Determining if a suspect signal is derived from a watermarked original signal can include determining if the suspect signal contains a second watermark.

In yet other embodiments the generation of first and second watermark indicators includes transforming the watermarked original signal and the suspect signal into another domain, for example by using Fourier transforms, Discrete Cosine transforms or Wavelet transforms.

In other embodiments a method of determining if a second signal is derived from a first signal is provided. At least one first watermark indicator is generated based on the watermarked original signal and the watermark, and at least one second watermark indicator is generated based on the suspect signal and the watermark. Determination of whether a portion of the suspect signal is derived from a portion of the watermarked original signal is based on the at least one first and second watermark indicators. The first signal can optionally have a watermark incorporated therein. The first signal can further optionally contain a watermark derived based on information in the first signal.

In yet other embodiments an overall indicator of authenticity is computed from the first and second indicators. The overall indicator can be compared to a plurality of thresholds to indicate the authenticity of the second signal.

In still another embodiment of the present invention, an apparatus for determining if a suspect signal is derived from a watermarked original signal is provided. A first watermark indicator generator is configured to compute a first watermark indicator based on the watermarked original signal. A second watermark indicator generator is configured to compute a second watermark indicator based on the suspect signal. An authenticator is configured to determine if the suspect signal is derived from the watermarked original signal based on the first and second watermark indicators.

One feature of the present invention is that determination of whether a suspect signal is derived from the watermarked original signal is based on the suspect signal, the watermarked original signal, and the watermark, that is, without using the original signal. Therefore, the owner does not have to provide access to the original signal to permit the authentication analysis of the suspect signal.

Additional features of the invention will become apparent to those skilled in the art upon consideration of the following detailed description of the preferred embodiments exemplifying the best mode of carrying out the invention as presently perceived.

DETAILED DESCRIPTION OF THE ILLUSTRATIVE EMBODIMENTS

Figure 1:
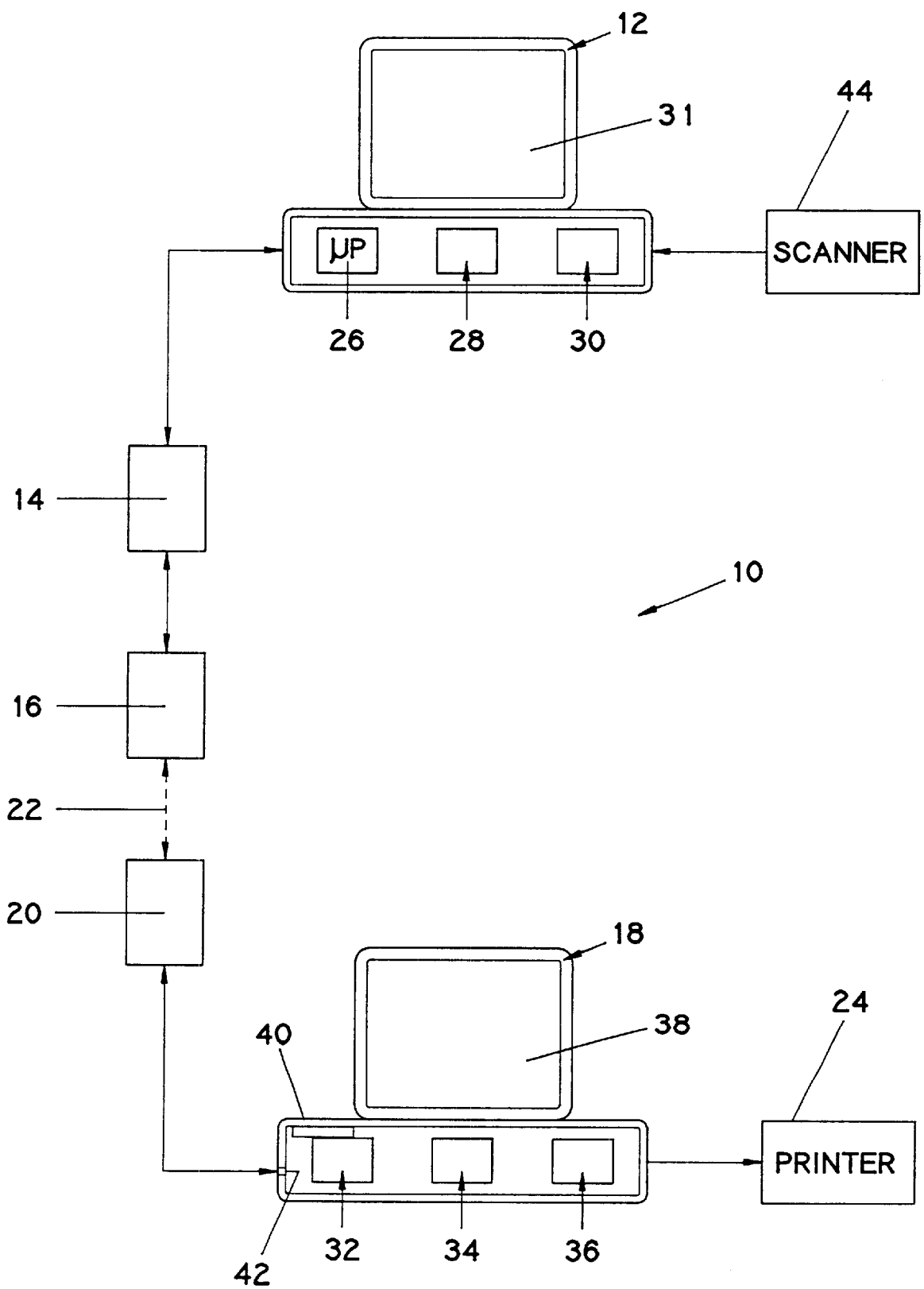
FIG. 1 is a block diagram of a computer system configured with a processor and memory for implementing embodiments of the present invention and connected over a network to another computer.

The present invention lends itself to implementation in a conventional computer network 10 as shown in FIG. 1. Computer network 10 illustratively includes computer systems 12, 18 connected through a series of network communication devices 14, 16, 20 (e.g., modems, transceivers, etc.) for communication over a network 22 such as the standard telephone lines, or the Internet or World Wide Web. Computer systems 12, 18 are illustratively personal computers and each includes basic elements such as a processor 26, 32, memory 28, 34, storage device 30, 36, and display 31, 38. Computer systems 12, 18 also include optional peripheral devices such as a conventional printer 24, scanner 44, and removable storage device 40 (e.g., a CD-ROM or 3½ inch disk drive).

An owner or originator of information for which protection is sought, such as copyrighted image, video or audio information, would place the information onto computer system 12 through any of a variety of means, such as scanning the information with scanner 44 or creating the information using software on computer system 12. A third party could then have access from computer system 18 to the information on computer system 12 over network 22, presenting the risk that the third party would illegally copy or otherwise misuse the protected information. For example, the third party could provide a separate copy of the information to other computer systems (not shown) over network 22 or generate paper copies of the protected information using printer 24 in violation of the owner's copyright.

One aspect of the present invention provides for authenticating whether suspect information contains the original, protected information by incorporating a watermark onto the original information before making it available over network 22. The suspect information is examined for the presence of the watermark, and if the suspect information contains the watermark then it may have been copied or derived from the original information. It is noted that mere presence of the watermark may by itself not be enough to determine derivation or copying. If an otherwise dissimilar work contains the watermark it may not indicate derivation or copying, it instead may indicate that the same watermark has been applied to two different works. There should be a perceptual correlation between the original signal and the suspect signal apart from the watermark before a determination of derivation or copying is made, that is, for images the suspect signal must be visually similar to the original signal, for audio signals the suspect signal must be audibly similar to the original signal, etc.

In the context FIG. 1, the owner of the information can access suspect information from computer system 12 over network 22 or scan the suspect information into computer system 12 using scanner 44. After determining that the suspect information is derived from the original information by using the method and apparatus of the present invention, the original owner will then be able to take appropriate steps to protect the owner's rights in the information against any parties responsible for the suspect information.

Although the present invention is disclosed in the context of certain types of digital watermarks incorporated onto certain types of digital signals in a processor based environment such as computer network 10, it is understood that the invention applies broadly to the use of watermarks for authenticating information by examining a suspect signal for the presence of a known watermark. It is further understood that the embodiments discussing digital images apply equally to any digital signal, such as digital audio or video.

Figure 2:
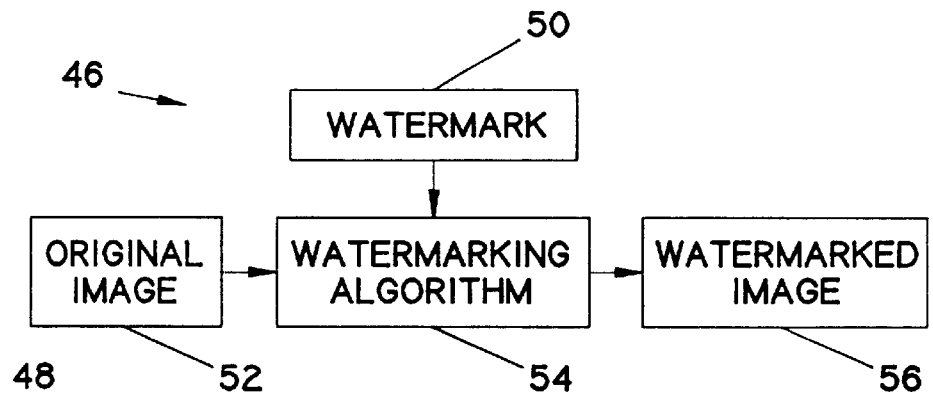
FIG. 2 is a block diagram showing a watermarking algorithm used to generate a watermarked original signal.

A watermark 50 is incorporated onto an original image 52 by a watermarking algorithm 54 to produce a watermarked original image 56 as shown by the block diagram of a watermarked image generator 46 in FIG. 2. There are numerous techniques for providing watermark 50. For example, visually imperceptible watermarks can be generated by a checksum technique where the watermark is a function of the pixel values of the original image 52, and the checksum watermark is then incorporated onto the least significant bit (LSB) plane of the image. It is understood that the present invention contemplates any watermarking algorithm 54, conventional or otherwise, for providing and incorporating watermark 50 onto original image 52 to create watermarked original image 56.

Illustrative embodiments of the present invention provide a watermark based on a modified m-sequence. A linear feedback shift register with n stages can form pseudo-random binary sequences with periods as large as $2^n-1$; m-sequences achieve this maximum period and have excellent randomness and autocorrelation properties. An extended m-sequence is created by appending a zero to the end of the longest run of zeros in an m-sequence. Two types of sequences may be formed from an m-sequence: unipolar and bipolar. The elements of a bipolar sequence are $\{-1,1\}$ and the elements of a unipolar sequence are $\{0,1\}$. The values of the watermark correspond to changes in the values of an original signal or a suspect signal from incorporation of the watermark.

Forming a watermark based on a random bipolar sequence such as a bipolar m-sequence or extended m-sequence results in a bipolar watermark that when added to the original image does not change the average brightness of the pixels in the image plane to which the bipolar watermark is added. Thus, multiple bipolar watermarks can overlap each other without changing the average brightness of the original image. Successive incorporations of bipolar watermarks thus can be used, for example, to support tracing the chain of custody of an image.

Embodiments of the present invention use extensions to providing a watermark based on m-sequences known as two-dimensional watermarks based on m-sequences. In one embodiment hereafter referred to as the constant-W two-dimensional watermark (CW2D), the watermark 50 is created by forming an m-sequence and then shaping it to form a block (w) of the watermark. For example, the watermark block is created by forming a $2^{16}-1$ period bipolar m-sequence and then shaping the sequence to form a 256× 256 watermark block (w). To create a block of the watermarked original image (y) a 256×256 block of the original image (x) is extracted to which w is added:

$$y = x + w$$

This process is repeated until the entire image is marked. The total number of watermark blocks (w) in a watermark 50 is image dependent. It is also possible that each watermark block can be different, that is, a first portion of the watermark 50 can have a first range of values, e.g., bipolar, and a second portion of the watermark 50 can have a second range of values, e.g., unipolar.

In another embodiment hereafter referred to as the variable-W two-dimensional watermark (VW2D), the watermark is created based on an m-sequence having a longer period, illustratively longer than the size of the image to be watermarked. For example, a bipolar m-sequence with a period of $2^{96}-1$ is obtained, and the first 128 bits are discarded for security reasons. The next 64 bits are shaped column-wise into an 8×8 block (w). The next 32 bits are discarded. This step repeats to form additional watermark blocks. The marking and verification procedures for the VW2D are the same as in the CW2D above.

After watermark 50 has been incorporated onto original image 52 then the watermarked original image 56 is made available, for example on network 22 such as the Internet, or by distribution on physical media such as a CD-ROM, computer disc or in printed form such as in a magazine. Optionally, watermarked original image 56 can be filtered, such as by JPEG or GIF compression before making it available. After the watermarked original image is made available, the owner of watermarked original image 56 is subject to a risk of unauthorized copying or derivation from third parties.

An m-sequence requires a seed, in this case a 96-bit value. This seed can be an arbitrary code, or it can convey certain information, such as a user identification code. Illustratively, the seed can be a time stamp of an original image (see below). Using a timestamp thwarts the IBM attack as discussed in Appendix A.

Figure 3:
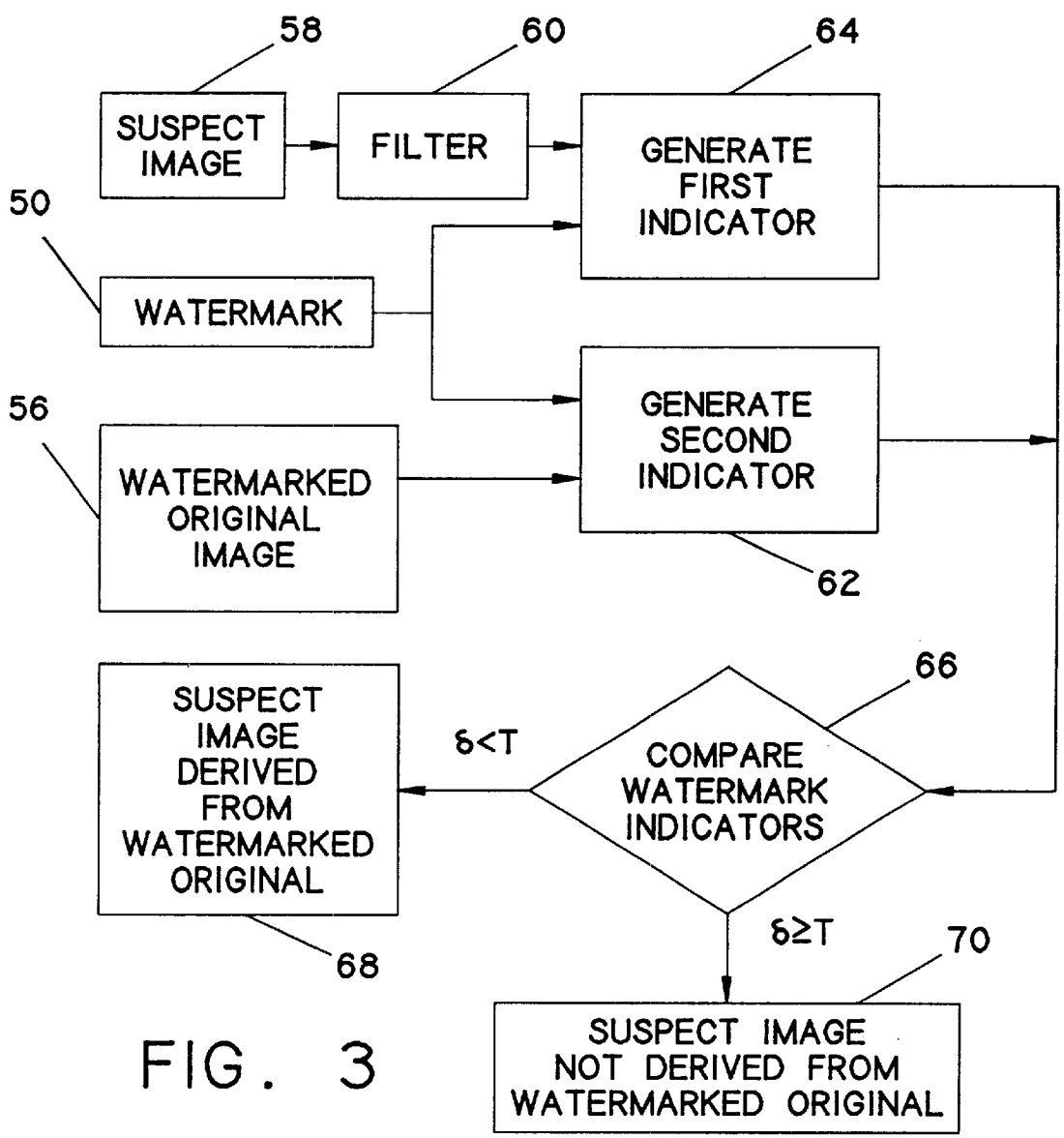
FIG. 3 is a flow chart showing steps used in a watermark authentication algorithm.

A suspect image 58 is authenticated as copied or derived from the watermarked original image 56 as shown in the suspect image authenticator 48 of FIG. 3. Suspect image 58 must first be obtained, for example by identifying a possibly forged image from the Internet or from a magazine picture that can be scanned in using scanner 44. If necessary, suspect image 58 is processed through a filter 60, for example if needed to JPEG or GIF decompress the suspect image 58 and to ensure that it is the same size and orientation as the watermarked original image 56. A portion of the suspect image to examine can then be extracted. Generation of a test indicator 64 for suspect image 58 is then performed based on suspect image 58 and watermark 50. A corresponding test indicator 62 for watermarked original signal 56 is generated based on watermarked original signal 56 and watermark 50.

It is noted that test indicator 62 for watermarked original signal 56 can be computed "off-line," that is, independently of an authentication system. The authentication system can be supplied test indicator 62 for watermarked original signal 56 and would need only to generate test indicator 64 for suspect image 58.

Illustratively, generation of test indicators 62, 64 is performed by using a cross-correlation function between the watermarked image, that is, watermarked original image 56 (Y) or suspect image 58 (Z), and watermark 50 (W). The equation for computing the cross-correlation value for a block of watermarked original image 56 is:

$$R_{yw}(\alpha, \beta) = \sum_i \sum_j y(i, j) w(i - \alpha, j - \beta)$$

For a block of suspect image 58, the equation similarly is:

$$R_{zw}(\alpha, \beta) = \sum_i \sum_j z(i, j) w(i - \alpha, j - \beta)$$

In the above equations, i and j are the pixel row and column of the block. The cross-correlation values are a function of $\alpha$ and $\beta$ which are horizontal and vertical offsets respectively, and illustratively can both be zero. In addition to any horizontal and vertical alignment of the suspect image, it may also be necessary to rotate the suspect image, which can be accomplished by any technique, such as a least squares method. It may also be necessary to scale the suspect image, which similarly can be accomplished by any known technique.

Still referring to FIG. 3, the test indicators are then compared in block 66 to determine whether suspect signal 58 is copied or derived from watermarked original signal 56. Illustratively, a difference value $\delta$ is obtained by subtracting the cross-correlation value for the block of suspect image 58 from cross-correlation value for the block of watermarked original image 56:

$$\delta = R_{yw}(0,0) - R_{zw}(0,0)$$

If $\delta<T$, where T is a test threshold, then there is strong correlation between suspect signal 58 (Z) and watermarked original signal 56 (Y). Strong correlation indicates suspect signal 58 is perceptually identical or similar to original image 52 (X) and contains watermark 50 (W), and thus is derived from watermarked original signal 56 (Y). Large values of T tolerate changes to the marked image block Y. In the case of an exact match, that is, Z=Y, then the cross-correlation values will match and $\delta=0$.

An average of $\delta$ for all blocks can also be obtained:

$$E[|\delta|] = \frac{1}{N_B} \sum_i \sum_j \delta_{ij}$$

$\delta_{ij}$ is the value of $\delta$ for the ith, jth block, and $N_B$ is the number of blocks in the image. This average for $\delta$ can be used as an overall test statistic to authenticate a signal. For example, using 8×8 blocks in a 512×768 pixel image results in 6,144 individual $\delta$ that are averaged to compute an overall $E[|\delta|]$.

$E[|\delta|]$ and $\delta$ provide a two-tiered approach for authentication, where $E[|\delta|]$ for the suspect signal is first compared to an overall threshold, allowing for authentication of a suspect signal even if $\delta$ for an individual block would fail. If the overall test statistic is sufficiently small then the suspect image is perceptually identical to the original watermarked image, that is, it is fully authentic. After evaluating the overall test statistic, the second tier examines the individual δ to determine the extent and localization of differences between the suspect signal and the original watermarked signal.

Experimental results for six different 768×512 images established that a threshold for $E[|\delta|]$ to establish full authenticity is about 10. If $10<E[|\delta|]<100$ then the suspect signal is still authentic but has been changed from the original watermarked signal. If $100<E[|\delta|]<200$ then the suspect signal probably is authentic but has been significantly altered. If $E[|\delta|]>200$ then the suspect signal has either been altered beyond recognition or was not derived from the original watermarked signal. Thus the relative value of $E[|\delta|]$ establishes a degree of authenticity of the suspect signal. It is understood that these threshold values can vary. This testing paradigm is described in an article by the inventors, Wolfgang and Delp, *A Watermarking Technique for Digital Imagery: Further Studies*, the complete disclosure of which is incorporated by reference and included as Appendix A.

The watermark testing approach of the invention provides for authentication of suspect signal 58 based only on watermark 50 and watermarked original signal 56, that is, without reference to original signal 52 used in generating watermarked original signal 56. This approach for authenticating suspect signal 58 further provides for variation of the level of tolerance to changes by adjusting T, that is, the tolerance can vary according to the particular signal type or be user-determined. Changes of any magnitude in an image may be detected with an appropriate choice of T. The threshold T can be defined relative to the number of elements used to compute the cross-correlation values. This authentication approach is also not computationally intensive, since it is not necessary to obtain the cross-correlation function for all offsets α and β.

By dividing a signal into portions, such as an array of pixels in an image into sub-arrays of pixels, and generating test indicators, such as cross-correlation values, for the portions or sub-arrays, it is possible to localize changes in a signal to a particular portion or sub-array. The test indicator for any particular portion of the signal is not diluted or otherwise affected by the remainder of the signal. Forgeries made to one portion of the signal or sub-array of pixels do not affect other portions or sub-arrays. Thus, the present invention provides for authentication of a portion of a signal. As a corollary, determination that a portion of a signal is inauthentic can rule out authenticity of the signal based on only a portion of the signal.

The methods and apparatus of the present invention apply to both monochrome and color images. For example in 24-bit color images, each color plane may be treated as a monochrome image. If a color image is in RGB format, W can be added to each color plane. Another possibility is to add W to the first color plane, then add an encrypted version, $W_E$, of W to the second plane, and finally add an encrypted version of $W_E$ to the third plane. For YUV images, W can be added to only the Y plane (luminance) or to all planes. Three-dimensional watermarks are also possible. For example, individual bits in W may be added to the color plane specified by a random tripolar sequence. In this way each color plane would only contain on average one third of the watermark. Alternatively, W may be an intrinsically three-dimensional array and verification would be performed using a three-dimensional cross-correlation function.

Although the embodiments of the invention have been discussed primarily in the context of digital images, it is understood that they apply to generally to signals, including, for example, audio and video signals. For example, the invention contemplates an invisible and secure means for embedding a checksum or hash into the higher order bits of a video signal. A hash function has as its input an arbitrary length binary sequence P, and returns as an output a fixed length binary sequence H.

$$H=H(P)$$

H is a function of all the input bits. Changing a single input bit will change the output significantly. A hash function has several useful properties: it is computationally trivial to reproduce H, given P; it is extremely difficult to reproduce P, given only H, and it is very difficult to find two inputs $P_1$ and $P_2$ that produce the same H.

Figure 4:
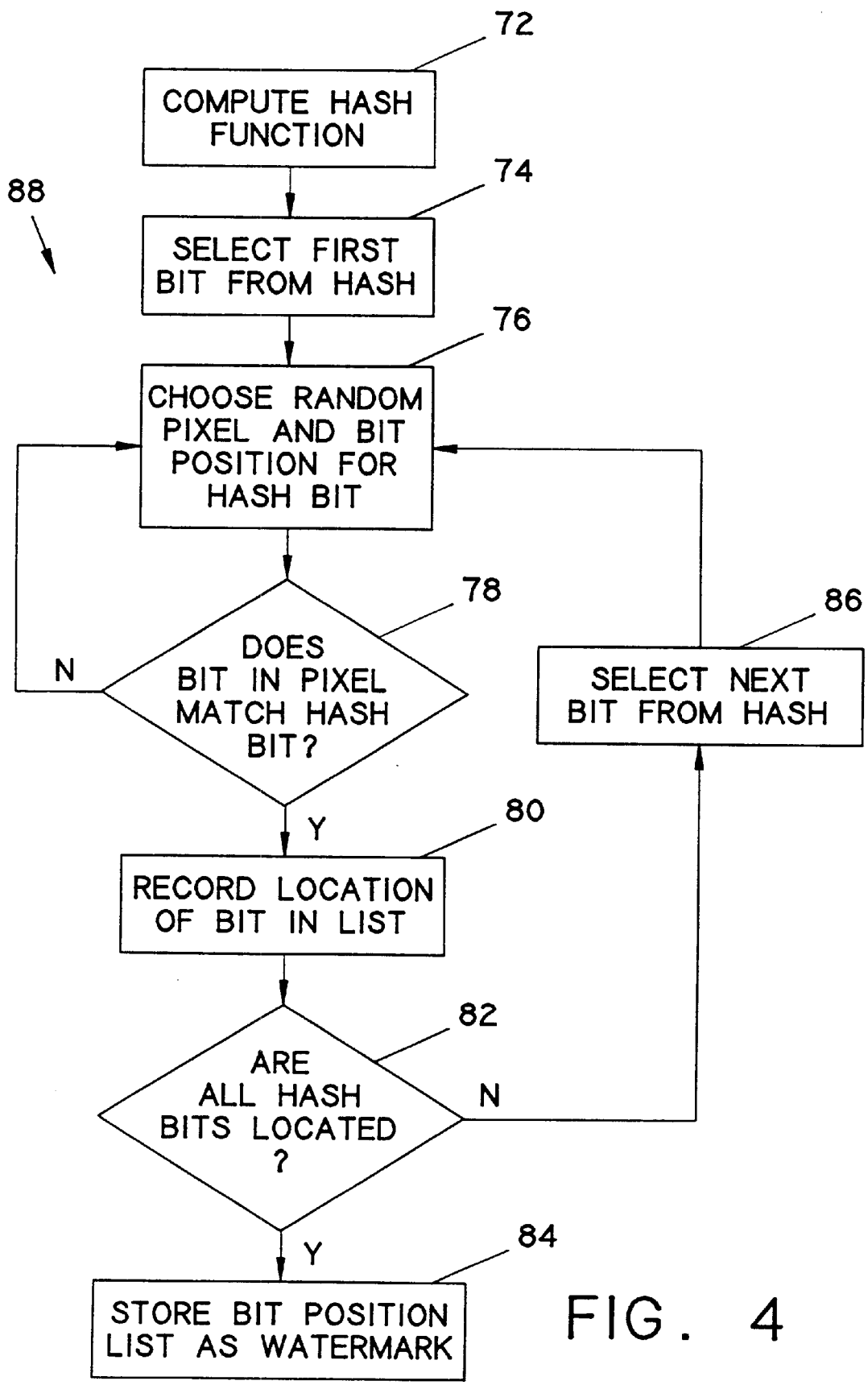
FIG. 4 is a flow chart showing steps in a watermark authentication technique called a Video Hash Function.

A method according to the present invention hereafter referred to as the Video Hash Function 88 includes the following steps as shown in FIG. 4. A hash is computed in block 72, for example by computing a hash function of the pixel data from a video frame. In block 74 the first hash bit is selected, and in block 76 a pixel and bit position is chosen at random to contain the selected hash bit. In block 78, if the bit in the pixel does not match the hash bit, a new, different bit position is chosen at random in block 76. In block 80, when a match is found, the location of the bit is recorded in a list. In block 82, a check is made to see if all hash bits are located, and if so then in block 84 the bit position list is stored as watermark 50. Otherwise, the next bit from the hash is selected in block 86 and the sequence beginning with block 76 is repeated.

The watermark 50 (W) is the bit position list of the hash and the watermarked original image 56 (Y) is the original image 52 (X). Thus, with the Video Hash Function 88 there is no "marking procedure." The sample space at each step of the marking procedure is every bit in the entire video frame. In order to provide robustness to errors, the hash function computation and bit location search can ignore the LSB for any pixel value. Furthermore, a hash with a large number of bits provides improved security against deciphering the watermark.

The Video Hash Function 88 supports overlapping watermarks, since the marking procedure does not actually alter the original video signal. Localization can also be achieved by using a secondary watermarking technique such as VW2D. Unlike checksums, the hash result can be made public without weakening the security of the technique so long as the watermark is kept secret. One approach to using the Video Hash Function 88 is to embed watermark 50 in an EPROM chip (not shown) that is inserted into a video playback device (not shown) designed to authenticate watermarked videos. Without the correct watermark in the chip, the device would disable viewing of the watermarked video. The device could further automatically erase the EPROM after a certain number of viewings.

A Timestamp Function can also be used with the Video Hash Function as follows. First a hash value is generated using the video frame data as an input to the hash function. It is understood that other information can alternatively or additionally be used to generate the hash value, for example a user identification code, time information, etc. The returned hash value is sent to a trusted third party that in turn creates and returns a timestamp value, also known as a certificate. Additional information on timestamps is found in *Applied Cryptography* by Bruce Schneier (Wiley Press, 2d ed. 1996) which is hereby incorporated by reference.

A bit position list is subsequently generated to effectively embed the timestamp or certificate in the video frame according to the Video Hash Function as shown in FIG. 4. It is understood that a bit position list can be used to generate a representation of arbitrary information embedded in a signal, regardless of whether a haash function is used. A suspect signal can subsequently be authenticated by examining it for the presence of the embedded information represented by the bit position list, such as the timestamp.

A video frame can also be verified by using only the bit position list generated by the Video Hash Function 88. First, a bit position list would generated by using the original video frame as the input to the hash function. A suspect video frame would be authenticated as matching the original video frame if the bit position list generated by using the suspect video frame as input to the hash function returned the same hash value as the original video frame. This approach alleviates the need to generate or examine the timestamp as in the Timestamp Function approach discussed above. The only requirements are knowledge of the bit position list and the hash function, which can be any conventional hash function such as the NIST standard SHA-1.

Figure 5:
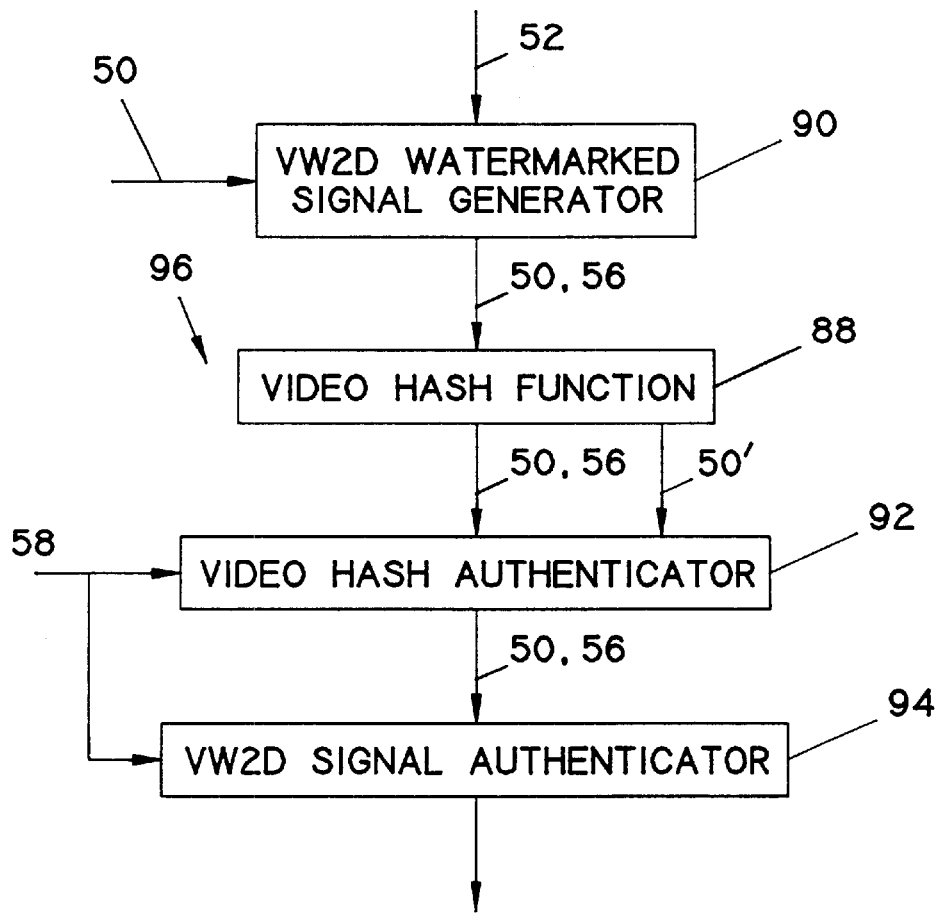
FIG. 5 is a flow chart showing steps in a two-tier watermark authentication technique based on the Video Hash Function of FIG. 4.

The Video Hash Function 88 can form the first stage of a two-tiered watermark authenticator 96 as shown in FIG. 5. In block 90, the original signal 52 is first marked with a VW2D watermark to generate watermarked original signal 56, and then the Video Hash Function 88 is used to generate a video hash watermark 50' for the watermarked original signal 56. Suspect signal 58 is examined for the presence of the video hash watermark 50' in block 92, and if hash watermark 50' is not intact in suspect signal 58, then a VW2D authenticator according to the process of FIG. 3 is executed to determine the extent and localization of changes between suspect signal 58 and watermarked original signal 56.

Experimental Results

Figure 6:
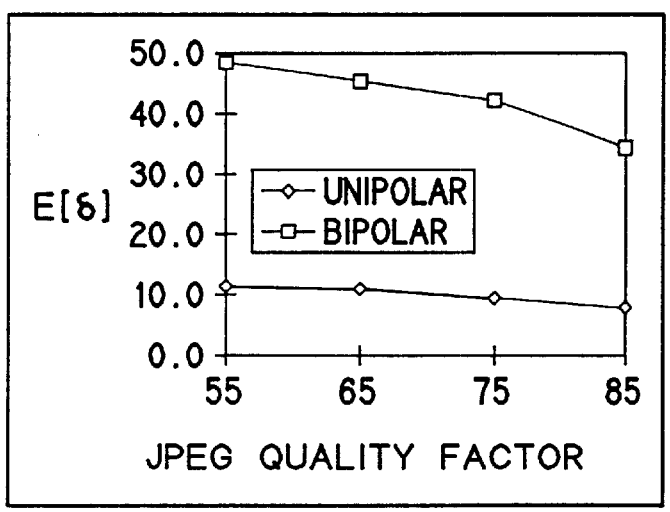
FIG. 6 is a graph showing experimental test results for determining the presence of a bipolar and a unipolar watermark in a suspect JPEG image over a range of JPEG quality factor.

In Experiment #1 the effects of filtering images watermarked with VW2D was measured. JPEG, was used to compress a watermarked image, Y. The forged image, Z, was the decompressed image. All $\delta$ were obtained for four different images, each compressed at a different JPEG quality factor: 55, 65, 75, 85. A factor of 100 corresponds to the highest image quality and bit rate. Experiment #1 was repeated using a unipolar watermark. FIG. 6 shows the average value of $\delta$ taken over all blocks versus quality factor. Table 1 and Table 2 provide statistics for $\delta$.

These statistics help determine thresholds for $\delta$ for use in authenticating a suspect image block. A single indicator can be used to determine if a suspect image block is authentic. In the experimental results of Table 1 and Table 2, this indicator is illustratively either E[$\delta$] or E[|$\delta$|]. E[|$\delta$|] is more reliable because E[$\delta$] can be negative. The statistics for $\delta$ for the unipolar watermark were much lower than those of the bipolar watermark. Higher quality factors produced lower values of $\delta$ within the same watermark. If it is desired that W not affect the image brightness, bipolar watermarks should be used. This is especially true when W from different owners will occupy the same image block, as in an audit history of an image. FIGS. 7a–8b show histograms of $\delta$ for Experiment #1.

TABLE 1

Statistics of $\delta$ using a bipolar watermark

| Q.F.: | 55 | 65 | 75 | 85 |
|---|---|---|---|---|
| E [ $\delta$ ] | 48.446 | 45.642 | 41.657 | 34.441 |
| E [ |$\delta$| ] | 51.920 | 48.832 | 44.499 | 37.099 |
| Max ($\delta$) | 219 | 189 | 191 | 155 |
| Min ($\delta$) | −142 | −121 | −114 | −95 |

TABLE 2

Statistics for $\delta$ using a unipolar watermark.

| Q.F.: | 55 | 65 | 75 | 85 |
|---|---|---|---|---|
| E [ $\delta$ ] | 10.603 | 10.781 | 10.018 | 8.467 |
| E [ |$\delta$| ] | 21.228 | 18.275 | 15.457 | 12.095 |
| Max ($\delta$) | 104 | 90 | 87 | 65 |
| Min ($\delta$) | −95 | −91 | −71 | −51 |

If JPEG compression and decompression should maintain the authenticity of an image, then threshold value for the overall indicator should be somewhat large, illustratively about 60 for bipolar watermarks and about 25 for unipolar watermarks. For GIF compression and decompression, threshold values can illustratively be 10 for unipolar watermarks. See Appendix A. A similar threshold can be determined for GIF compression of an image having a bipolar watermark. It is understood that such thresholds can be determined for any signal, such as MPEG, DPCM, GIF89, etc.

It is important for an authentication technique such as VW2D to authenticate a suspect image notwithstanding small changes. Experiments #2 and #3 show that suspect images created from minor changes to an original watermarked image resulted in very small changes in $\delta$ and E[|$\delta$|]. In other words, minor errors that occur in a watermarked original image, for example during storage and transmission, will not prevent the authentication system from identifying this image as a copy of the original.

Experiment #2 measured the effect of random bit errors. First, the original image X was watermarked to form Y. The watermarked image was JPEG compressed and decompressed to form $Y_f$. Then the LSB in $Y_f$ was changed according to a given error rate to form an error image $Z_f$. This is to simulate errors that may be introduced into the signal, for example during compression or transformation. This experiment was performed with both the unipolar and bipolar watermarks, and the four quality factors used above. Table 3 shows the statistics of $\delta$ taken over all image blocks when the bipolar watermark is used. Table 4 shows the statistics of $\delta$ for the unipolar watermark. For a given error rate, the same sequence of errors were used for each quality factor and watermark.

TABLE 3

Statistics of $\delta$ with a bipolar watermark

| | Quality Factor | | | |
|---|---|---|---|---|
| Err. Rate | 55 | 65 | 75 | 85 |
| $E[\delta]$ | | | | |
| 0.005 | −8.14E−04 | −4.88E−04 | −4.88E−04 | 1.14E−03 |
| 0.0005 | −0.00033 | −0.00033 | −0.00049 | −0.00081 |
| 0.00005 | 6.51E−04 | 6.51E−04 | 9.77E−04 | 9.77E−04 |
| $E[|\delta|]$ | | | | |
| 0.005 | 2.65E−01 | 2.64E−01 | 2.65E−01 | 2.67E−01 |
| 0.0005 | 2.77E−02 | 2.80E−02 | 2.82E−02 | 2.85E−02 |
| 0.00005 | 3.91E−03 | 3.91E−03 | 4.23E−03 | 4.23E−03 |
| Max ($\delta$) | | | | |
| 0.005 | 3 | 3 | 3 | 3 |
| 0.0005 | 2 | 2 | 2 | 2 |
| 0.00005 | 1 | 1 | 1 | 1 |
| Min ($\delta$) | | | | |
| 0.005 | −4 | −4 | −4 | −4 |
| 0.0005 | −2 | −2 | −2 | −2 |
| 0.00005 | −1 | −1 | −1 | −1 |

TABLE 4

Statistics of $\delta$ with a unipolar watermark

| | Quality Factor | | | |
|---|---|---|---|---|
| Err. Rate | 55 | 65 | 75 | 85 |
| $E[\delta]$ | | | | |
| 0.005 | −0.01139 | −0.00081 | 0.000326 | 0 |
| 0.0005 | −0.00146 | −0.0013 | −0.0013 | −0.00081 |
| 0.00005 | −0.00033 | −0.00033 | −0.00033 | −3.26E−04 |
| $E[|\delta|]$ | | | | |
| 0.005 | 1.38E−01 | 1.38E−01 | 1.38E−01 | 1.38E−01 |
| 0.0005 | 1.22E−02 | 1.24E−02 | 1.24E−02 | 1.29E−02 |
| 0.00005 | 1.63E−03 | 1.63E−03 | 1.63E−03 | 1.63E−03 |
| Max ($\delta$) | | | | |
| 0.005 | 2 | 2 | 2 | 2 |
| 0.0005 | 1 | 1 | 1 | 1 |
| 0.00005 | 1 | 1 | 1 | 1 |
| Min ($\delta$) | | | | |
| 0.005 | −2 | −2 | −2 | −2 |
| 0.0005 | −1 | −1 | −1 | −1 |
| 0.00005 | −1 | −1 | −1 | −1 |

The result from Experiment #2 that $E[|\delta|]$ is relatively small for all test cases means that random errors in the LSB plane of a watermarked original image to not affect the ability to authenticate the image, even with very stringent thresholds for $E[|\delta|]$. This verifies the ability of VW2D to properly authenticate a suspect signal. Experiment #3 subsequently proved that compressing and decompressing a watermarked image that already has minor errors in the LSB plane also will not prevent authentication of the image.

In Experiment #3 the effect of random bit errors with compression was measured. Experiment #3 was performed on the error image $Z_J$ formed during Experiment #2. $Y_J$ is the image obtained after the watermarked image, Y, has been JPEG compressed and decompressed. $Z_J$ is the image that results from adding errors to $Y_J$. In this experiment $Z_J$ was JPEG compressed using the same quality factor used for $Y_J$. $Z_J$ was then decompressed and the verification procedure was used. Table 5 lists the statistics of $\delta$ for the bipolar watermark, and Table 6 shows $\delta$ for the unipolar watermark.

TABLE 5

Statistics of $\delta$ with the bipolar watermark after compression.

| | Quality Factor | | | |
|---|---|---|---|---|
| Err. Rate | 55 | 65 | 75 | 85 |
| $E[\delta]$ | | | | |
| 0.005 | 1.01E−02 | 3.10E−03 | −3.01E−02 | −2.33E−02 |
| 0.0005 | 0.0148 | −0.0049 | −0.0291 | −0.019 |
| 0.00005 | 1.48E−02 | −4.90E−03 | −2.91E−02 | −2.12E−02 |
| $E[|\delta|]$ | | | | |
| 0.005 | 3.49E−01 | 2.67E−01 | 1.50E−01 | 1.05E−01 |
| 0.0005 | 3.43E−01 | 2.59E−01 | 1.49E−01 | 1.07E−01 |
| 0.00005 | 3.43E−01 | 2.59E−01 | 1.49E−01 | 1.08E−01 |
| Max ($\delta$) | | | | |
| 0.005 | 36 | 30 | 18 | 16 |
| 0.0005 | 36 | 30 | 18 | 16 |
| 0.00005 | 36 | 30 | 18 | 16 |
| Min ($\delta$) | | | | |
| 0.005 | −35 | −32 | −32 | −16 |
| 0.0005 | −35 | −32 | −32 | −16 |
| 0.00005 | −35 | −32 | −32 | −16 |

TABLE 6

Statistics of $\delta$ with the unipolar watermark after compression.

| | Quality Factor | | | |
|---|---|---|---|---|
| Err. Rate | 55 | 65 | 75 | 85 |
| $E[\delta]$ | | | | |
| 0.005 | −0.9806 | −0.6727 | −0.3877 | −0.2316 |
| 0.0005 | −0.9668 | −0.6711 | −0.3882 | −0.2269 |
| 0.00005 | −0.9668 | −0.6711 | −0.3882 | −2.28E−01 |
| $E[|\delta|]$ | | | | |
| 0.005 | 1.05E+00 | 7.26E−01 | 4.29E−01 | 2.65E−01 |
| 0.0005 | 1.03E+00 | 7.25E−01 | 4.31E−01 | 2.61E−01 |
| 0.00005 | 1.03E+00 | 7.25E−01 | 4.31E−01 | 2.63E−01 |
| Max ($\delta$) | | | | |
| 0.005 | 17 | 16 | 16 | 9 |
| 0.0005 | 17 | 16 | 16 | 9 |
| 0.00005 | 17 | 16 | 16 | 9 |
| Min ($\delta$) | | | | |
| 0.005 | −60 | −42 | −33 | −24 |
| 0.0005 | −60 | −42 | −33 | −24 |
| 0.00005 | −60 | −42 | −33 | −24 |

Although the values for $E[|\delta|]$ for Experiment #3 were slightly larger than in Experiment #2, they are still small enough for authentication of the altered image. Some individual $\delta$, however, were as large as 60 in magnitude, indicating that certain blocks of the image would fail an authentication test that required $\delta$ for each individual block to fall below a certain threshold, for example in this case 50. The results of Experiment #3 demonstrate a situation appropriate for the two-tier approach of first using $E[|\delta|]$ for an overall indication of authenticity before evaluating individual $\delta$ to determine the extent and localization of any changes to the suspect image.

Although the invention has been described in detail with reference to certain illustrated embodiments, variations and modifications exist within the scope and spirit of the present invention as described and defined in the following claims.

3220-29056

APPENDIX A
-20/1-

A WATERMARKING TECHNIQUE FOR DIGITAL IMAGERY: FURTHER STUDIES

*Raymond B. Wolfgang and Edward J. Delp*

Video and Image Processing Laboratory (*VIPER*)
School of Electrical and Computer Engineering
Purdue University
West Lafayette, Indiana, 47907-1285
USA

Abstract

*The growth of networked multimedia systems has created a need for the copyright protection of digital images. Copyright protection involves the authentication of image ownership and the identification of illegal copies of a (possibly forged) image. One approach is to mark an image by adding an invisible structure known as a digital watermark. In this paper we further study techniques for marking images introduced in [1]. In particular, we describe how our techniques withstand random errors. We also provide more details relative to our verification procedure. Finally, we discuss the recently proposed IBM attack.*

*Keywords: Digital Watermarking, Multimedia Security, Copyright Protection*

1. Introduction

The recent growth of networked multimedia systems has increased the need for the protection of digital media. This is particularly important for the protection and enforcement of intellectual property rights. Digital media includes text, digital audio, images, video and software. Many approaches are available for protecting digital data; these include encryption, authentication and time stamping. We propose to study techniques for image authentication and forgery prevention known as watermarks.

---

This work was partially supported by a grant from the AT&T foundation. Address all correspondence to E.J. Delp, ace@ecn.purdue.edu, http://www.ece.purdue.edu/~ace, or +1 765 494 1740.

Techniques are needed to prevent the copying, forgery and unauthorized distribution of images and video. Without such methods, placing images on a public network puts them at risk of theft and undetected alteration. The basic scenario is as follows: A user has created an electronic image at some effort and expense, and wants to make it available on a communications network. When unauthorized copies or forgeries of the image appear elsewhere on the network, the user needs to prove that the image belongs to them. One also needs to determine if and by how much the image has been changed from the original. Image protection algorithms must provide:
1. Copy detection to identify unauthorized copies of an image.
2. Content authentication to verify the content of a copy of an image, since the copy may have been forged or filtered.
3. Owner authentication to prove that the user is the true owner of the image.

Other requirements could be:
1. Chain-of-custody determination
2. Time stamping to verify when an image was created and/or viewed.

2. Background

A watermark is a, secret code or image incorporated into an original image. The use of perceptually invisible watermarks is one form of image authentication. A watermarking algorithm consists of three parts: the watermark, the marking algorithm and the verification algorithm. Each owner has a unique watermark. The marking algorithm incorporates the watermark into the image. The verification algorithm authenticates the image, determining both the owner and the integrity of the image.

Many digital watermarking techniques rely on random sequences incorporated into to an image's spatial or spectral representation. One approach adds a modified maximal-length linear shift register sequence (m-sequence) to the pixel data. They identify the watermark using correlation techniques [2,3]. Watermarks can also modify the image's spectral or transform coefficients directly. These algorithms most often modulate DCT coefficients according to a sequence known only to the owner [4]. A different spectrum-based technique passes the image through a sub-band filter before marking an image [5]. Many of these watermarking techniques depend on the image content; the techniques increase the level of the watermark in the image while maintaining the imperceptibility of the mark [6,7]. Other watermarks also use the Human Visual System [8]. Visible watermarks also exist; IBM has developed a proprietary visible watermark to protect images that are part of the digital Vatican library project [9]. Most of these techniques may be used in combination with each other.

M-sequence spatial methods tolerate errors to an image, and can also locate where an image has been altered. The basic m-sequence spatial approach [2] adds a modified m-sequence to the original image. Two types of sequences may be formed from an m-sequence: *unipolar* and *bipolar*. The elements of a bipolar sequence are {-1,1} and the elements of a unipolar sequence are {0,1}.

3. Two Dimensional Watermarks

This section overviews two two-dimensional watermarking techniques we present in [1]. The second technique provides better security and more precise localization for image alterations.

3.1 The Constant-W 2D Watermark

The *constant-W two-dimensional watermark* (CW2D) is formed as follows:

1. Form a $2^{16}-1$ period bipolar m-sequence.

3220-29056

-21/2-

2. Shape this to form a 256 × 256 watermark, W.

To mark the image, a 256 × 256 block of the image, X, is extracted $$Y = X + W \quad (3)$$

where Y is the watermarked image block. This process is repeated until the entire image is marked. The total number of watermark blocks is image dependent. To verify a possibly forged image block Z, one must obtain the spatial crosscorrelation function:

$$R_{ZW}(\alpha, \beta) = \sum_x \sum_y Z(x, y) W(x - \alpha, y - \beta) \quad (4)$$

$$\delta = R_{YW}(0,0) - R_{ZW}(0,0) \quad (5)$$

The test statistic for the image block is $\delta$. If $\delta < T$, where T is the test threshold, Z is genuine. If Z = Y, then $\delta = 0$. The advantages of this technique are presented in [1], as are the effects of linear and non-linear filtering.

3.2 Color Images

For 24 bit color images, each color plane may be treated as a monochrome image. If a color image is in the RGB color space, W can be added either to each color plane, or to one plane. For the YUV color space, one may choose to add W to the Y plane (luminance). Another possibility is to add W to the first color plane, then add an encrypted version, $W_E$, to the second plane, and finally an encrypted version of $W_E$ to the third plane. Three-dimensional watermarks are also possible:

3.3 The Variable-W 2D Watermark

The *variable-W two-dimensional watermark* (VW2D) is generated by:

1. A bipolar m-sequence with a period of $2^{96} - 1$ is obtained; and the first 128 bits are discarded.
2. The next 64 bits are shaped column-wise into an 8 × 8 block, W. The next 32 bits are discarded. This step repeats to form additional watermark blocks.
3. The marking and verification procedures are the same as in CW2D.

Advantages and disadvantages of VW2D are discussed in [1]. Also included are the effects of JPEG compression; the results indicate that VW2D works well with JPEG compression.

3.4 Random Bit Errors

We would like to investigate if VW2D can detect errors made to a JPEG compressed watermarked image. First, the original image X in Figure 1 was watermarked with VW2D to form Y (Figure 2). The watermark, $W_1$, is shown in Figure 3. The watermarked image was JPEG compressed and decompressed to form $Y_J$. Then the LSB in $Y_J$ was changed according to a given error rate to form an error image $Z_J$. This experiment was performed with both the unipolar and bipolar watermarks. To examine the effects for a wide range of data rates, four different quality factors were also used. Upon testing, the average of $\delta$ for all the blocks was obtained.

$$E[|\delta|] = \frac{1}{N_B} \sum_i \sum_j \delta_{ij} \quad (6)$$

where $\delta_{ij}$ is the value of $\delta$ for the $i^{th}$, $j^{th}$ block, and $N_B$ is the number of 8 x 8 blocks in the image. Table 1 shows the values of $E[|\delta|]$ for each case.

Table 1. $E[|\delta|]$ after the addition of errors.

| Q Factor: | 55 | 65 | 75 | 85 |
|---|---|---|---|---|
| Err. Rate | Bipolar Watermark | | | |
| 0.005 | 0.265 | 0.264 | 0.265 | 0.267 |
| 0.0005 | 0.0277 | 0.0280 | 0.0282 | 0.0285 |
| 0.00005 | 0.00391 | 0.00391 | 0.00423 | 0.00423 |
| | Unipolar Watermark | | | |
| 0.005 | 0.138 | 0.138 | 0.138 | 0.138 |
| 0.0005 | 0.0122 | 0.0124 | 0.0124 | 0.0129 |
| 0.00005 | 0.00163 | 0.00163 | 0.00163 | 0.00163 |

The changes to the images in this experiment are minor. For an error rate of 0.005, only an average of 1966 pixels are changed in the entire 512 x 768 image. The fact that $E[|\delta|]$ is very small shows that our test statistic is not robust to small alterations. This is a potential problem. However, we could examine individual values of $\delta$ to see which blocks have been changed. We would also like to investigate the effects on $E[|\delta|]$ of compressing $Z_J$.

3.5 Random Bit Errors with Compression

This experiment is important in the following situation. An attacker could download a watermarked image that has been JPEG compressed at a known quality factor. The attacker would decompress the image and make changes to it. To store or transmit the forged image, the attacker would then re-compress the distorted image. We need to determine whether compressing the forged image $Z_I$ will also produce a small variation in $E[|\delta|]$. $Z_I$ was first JPEG compressed and decompressed to form $Z_c$, using the same quality factor used for $Y_I$. The verification procedure was then performed. Table 2 lists the values of $E[|\delta|]$ for this experiment.

Table 2. $E[|\delta|]$ after adding errors + compression.

| Q Factor: | 55 | 65 | 75 | 85 |
|---|---|---|---|---|
| Err. Rate | Bipolar Watermark | | | |
| 0.005 | 0.349 | 0.267 | 0.150 | 0.105 |
| 0.0005 | 0.343 | 0.259 | 0.149 | 0.107 |
| 0.00005 | 0.343 | 0.259 | 0.149 | 0.108 |
| | Unipolar Watermark | | | |
| 0.005 | 1.05 | 0.726 | 0.429 | 0.265 |
| 0.0005 | 1.03 | 0.725 | 0.431 | 0.261 |
| 0.00005 | 1.03 | 0.725 | 0.431 | 0.263 |

Again $E[|\delta|]$ is quite small. A smaller quality factor will further increase $E[|\delta|]$, but not enough to make the changes easily detectable. These experiments show that very small changes to an image are very hard to detect by VW2D's authentication process. We will now discuss how the quantity $E[|\delta|]$ is used to verify images.

4. Interpreting the Test Statistic

We have made frequent mention of our test statistic, $E[|\delta|]$. In this section we will develop a testing paradigm for using $E[|\delta|]$ to verify the authenticity of an image. We will discuss the range of $E[|\delta|]$ for an image to be fully authentic, authentic but forged, possibly authentic and completely inauthentic (or watermarked by a 3220-29056

-23/1- different owner). To do this we will need two different thresholds for $E[|\delta|]$.

To develop these thresholds, we need to examine $E[|\delta|]$ in three situations:
1. When a watermark that is different from the embedded one is used to verify the image. This is equivalent to testing with a random watermark.
2. When the original unmarked image is tested with the watermark that will be embedded.
3. When an image has been watermarked a second time (IBM attack).

The proposed testing scenario is as follows. An image will be tested and $E[|\delta|]$ will be obtained. If $E[|\delta|]$ is greater than $E[|\delta|]$ obtained from testing with a different watermark, the image is considered either forged beyond recognition, or watermarked by a different owner. If $E[|\delta|]$ is less than $E[|\delta|]$ obtained from testing the original unmarked image, the test image is considered authentic. If $E[|\delta|]$ is between these values, then we can say that the image will likely belong to the watermark's owner, but has undergone some alterations. At this point, one would inspect the matrix, $|\delta|$, to determine exactly where in the image the alterations took place.

Figure 7A:
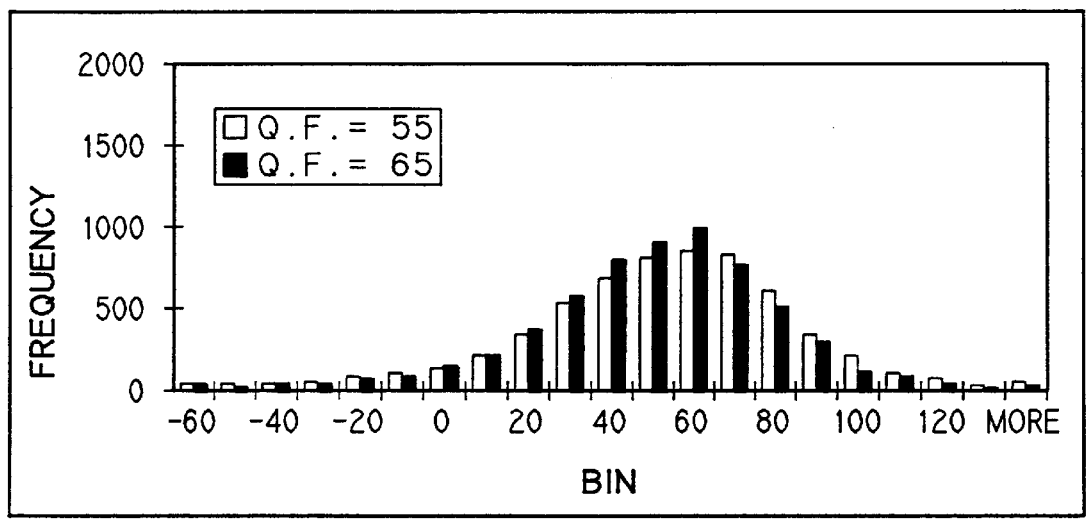
FIGS. 7a–b are histograms corresponding to the experimental results of FIG. 6 showing the difference between cross-correlation values based on the watermarked original image and values based on the suspect JPEG image for the bipolar watermark.
Figure 7B:
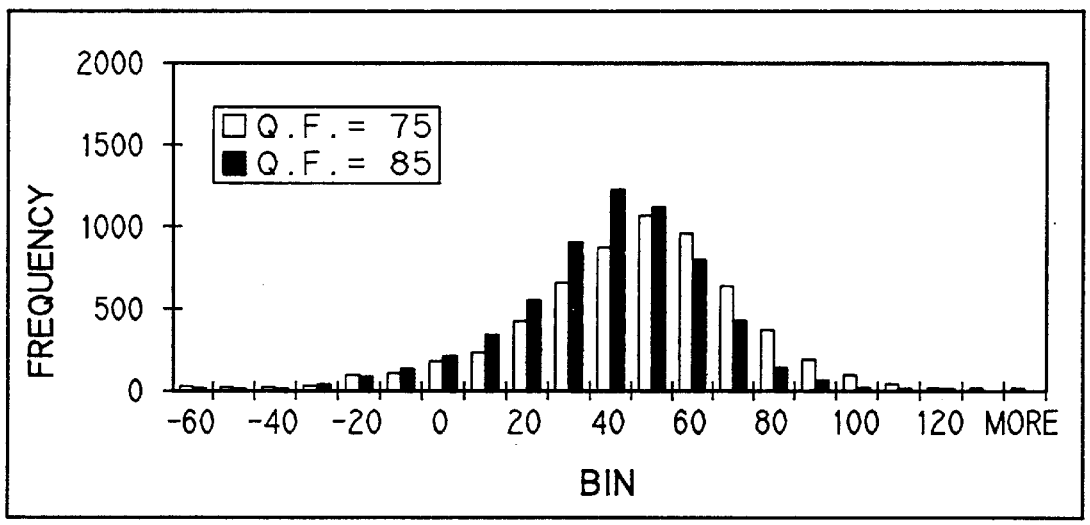

Table 3 lists the values for $E[|\delta|]$ for six different 512 x 768 color images and four different testing and attack scenarios. Each image was watermarked (in the green plane only) with $W_1$. Figure 4 shows the original Tia image, and Figure 5 shows the watermarked version. Figure 6 has been watermarked twice. Figure 7 shows the watermark used for the Tia photo. All tests with $W_1$ produced $E[|\delta|] = 0$, as expected. All tests used $W_1$ to obtain $\delta$. The test scenarios are:
1. Testing with a different watermark: $W_2$, with an initial fill = 'abcdefghijkl'. When $W_2$ is substituted for $W_1$, $E[|\delta|]$ is very large – between 300 and 700.
2. Testing with a third watermark: $W_3$ with an initial fill = '0123456789AB'. Testing an image with $W_3$ also produces values of $E[|\delta|]$ between 300 and 700.
3. Testing the original: The watermarked image is imperceptibly different from the original unmarked image. The value of $E[|\delta|]$ should therefore be relatively small compared to 300. The actual values are between 4 and 9.

4. Preserving the original watermark given a re-watermarking attack: The IBM attack involves subtracting a second watermark from a watermarked image. To test our method against this type of attack, we marked the marked image with $W_2$, then tested it with $W_1$. The values of $E[|\delta|]$ are quite small. It also indicates that the image under test does indeed contain our watermark, $W_1$. This attack is discussed in more detail in Section 6.

Table 3. $E[|\delta|]$ for six different 768x512 images

| Image | $W_2$ | $W_3$ | Orig. | $W_1+W_2$ |
|---|---|---|---|---|
| Canyon | 541.30 | 546.29 | 5.347 | 3.667 |
| Tia | 305.59 | 303.16 | 6.192 | 4.144 |
| Vegetab. | 461.53 | 466.54 | 4.047 | 3.107 |
| Fruit | 561.93 | 557.36 | 8.122 | 5.826 |
| Glass | 599.30 | 602.89 | 8.677 | 5.898 |
| Money | 647.36 | 647.48 | 7.060 | 5.890 |

A testing paradigm can now be established:
1. If $E[|\delta|] < 10$, the image is perceptually identical to the original, watermarked image. It is fully authentic.
2. If $10 < E[|\delta|] < 100$, the image belongs to the owner of $W_1$, but has been changed.
3. If $100 < E[|\delta|] < 200$, the image probably belongs to the owner of $W_1$, but has been significantly altered – possibly beyond recognition.
4. If $E[|\delta|] > 200$, the image has either been severely altered, or does not belong to the owner of $W_1$.

With this paradigm, all the images from Table 1 and Table 2 would be considered fully authentic. Also, all four sets of filtered images in [1] would pass.

5. Paletized Images

In many cases 24 bit color images are not used on web sites. Usually, 8 bit color images are used for simplicity. The common 8 bit color image format is the Graphics Interchange Format (GIF) [10]. These images are paletized from 24 bits/pixel to 8 bits/pixel. Paletization (quantization) can be considered as a type of image attack; we therefore want to examine the performance of VW2D with paletized images. Paletization can be thought of as a nonlinear filtering process. It is also a lossy operation. This section examines the effects of paletizing a watermarked 24 bit RGB image. The procedure for marking a GIF image, X, is:
1. Convert X to a 24 bit color image, Y
2. Mark Y (green plane only)
3. Generate $R_{Yw}(0,0)$
4. Quantize Y to 256 colors with a new color palette, call this Z
5. Distribute Z on the network To test an image, Z, one must:
1. Convert Z to 24 bit RGB color.
2. Test the 24 bit version of Z in the usual way, and obtain $E[|\delta|]$.

Figure 8A:
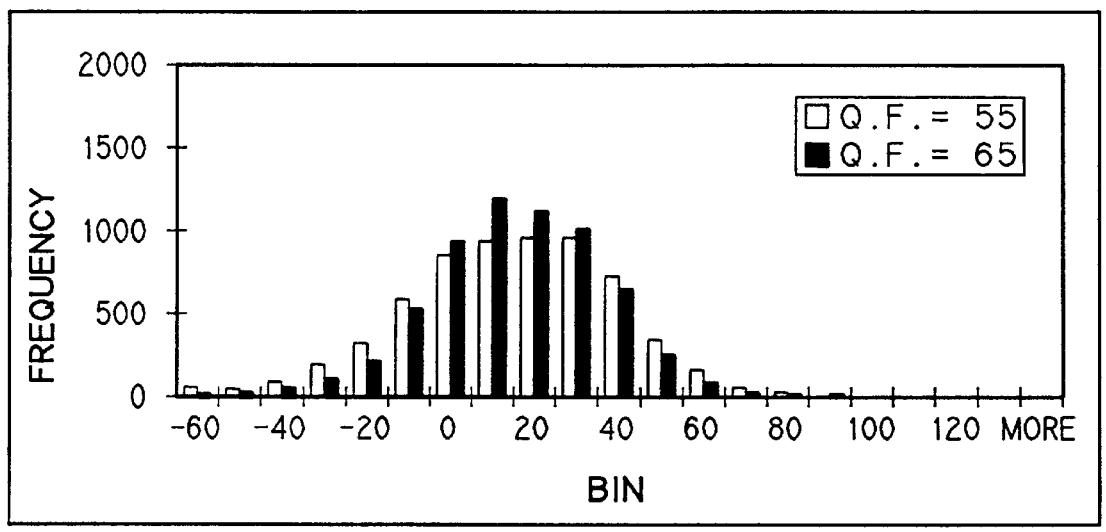
FIGS. 8a–b are histograms corresponding to the experimental results of FIG. 6 showing the difference between cross-correlation values based on the watermarked original image and values based on the suspect JPEG image for the unipolar watermark.
Figure 8B:
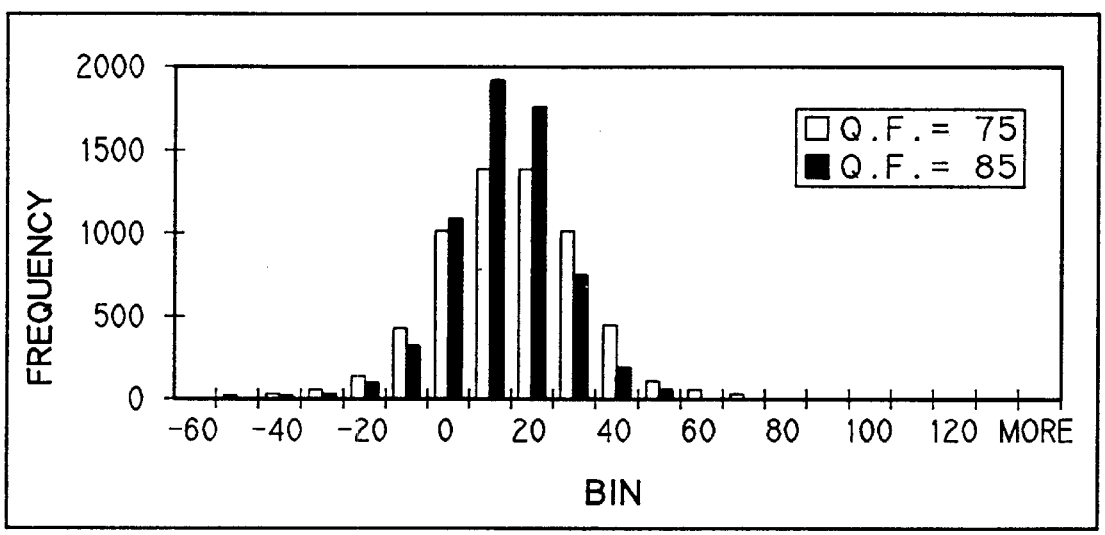

The concern is that step 4 in the marking procedure, quantization, will destroy the watermark. Note: a new color palette must be generated in this step; if X's color palette is used, the watermark will be completely destroyed upon quantization of Y. The six images used previously were first converted from 24 bit RGB to 8 bit paletized images. These were then watermarked with $W_1$, and tested with the above procedure. Figure 8 is the 8 bit glass image; Figure 9 is the watermarked copy. Table 4 lists the values of $E[|\delta|]$ for each image.

Table 4. Results of paletization

| Image | $E[|\delta|]$ |
|---|---|
| Canyon | 4.278 |
| Tia | 2.676 |
| Vegetables | 6.436 |
| Fruit | 7.560 |
| Glass | 1.465 |
| Money | 1.366 |

The values of $E[|\delta|]$ are small and hence each quantized image would be fully authenticated. Preliminary tests with $W_2$ have produced $E[|\delta|]$ that is approximately 600.

−24/2−

6. The IBM Attack

An attack on a wide class of watermarking schemes, including the VW2D, is proposed in [11]:

$$Y_1 = X + W_1 \quad (7)$$
$$X_F = Y_1 - W_2 \quad (8)$$
$$\Rightarrow Y_1 = X_F + W_2 \quad (9)$$

$X_F$ is known as the counterfeit original. The watermarked image, $Y_1$, now appears to be a marked version of $X_F$, marked with $W_2$. It cannot be discerned which is the actual original, X or $X_F$. Note that the counterfeit original was created *without* access to the true original, X.

One solution is to time stamp X when it is created [12]. Then, the owner with the earliest-dated original is the true owner. A watermark that is a non-invertible function of X would also securely determine ownership. Let H be the hash of X.

$$H = H(X) \quad (10)$$

In [11] it suggests using H to choose between two embedding equations. Our modification to VW2D is to use a time stamp, S, of X as the initial fill for watermark generation.

$$S = (H, T, U) \quad (11)$$

T is the time of X's creation, and U is the owner name.

$$Y_1 = X + W(S) \quad (12)$$

It is practically impossible to obtain the correct watermark, W(X), without knowing S. To successfully steal $Y_1$, one must find an $X_F$ such that $$X_F = Y_1 - W(S_F) \quad (8)$$

Since $W(S_F)$ depends on $X_F$, this task is very difficult.

7. Future Research

We plan to adapt the VW2D technique to watermark compressed and uncompressed video, including motion-JPEG, MPEG and H.263 sequences. Video watermarks require a fast verification procedure in order to authenticate video in real-time. The computation of δ may be too intensive for real-time video. For this reason we are researching alternative watermarking algorithms which are more computationally efficient.

A postscript version of this paper is available via anonymous ftp to skynet.ecn.purdue.edu in the directory /pub/dist/delp/cisst97-secure. Sample images are available at the following web site: http://www.ece.purdue.edu/~ace

8. References

[1] Raymond B. Wolfgang and Edward J. Delp, "A watermark for digital images," *Proceedings of the 1996 International Conference on Image Processing*, Lausanne, Switzerland, Sept. 16-19, 1996, vol. 3, pp. 219-222.

[2] R. G. van Schyndel, A.Z.Tirkel, N.R.A Mee, C.F. Osborne, "A digital watermark," *Proceedings of the IEEE International Conference on Image Processing*, Austin, Texas, USA, November, 1994, vol. 2, pp. 86-90.

[3] R. G. van Schyndel, A. Z. Tirkel, C. F. Osborne, "Towards a robust digital watermark," *Proceedings of the ACCV-95 Conference*, Nanyang Technological University, Singapore, December 5-8, 1995.

[4] Ingemar J. Cox, Joe Kilian, Tom Leighton and Talal Shamoon, "Secure spread spectrum watermarking for images, audio and video," *Proceedings of the 1996 International Conference on Image Processing*, Lausanne, Switzerland, September, 16-19, 1996, vol. 3, pp. 243-246.

[5] J.-F. Delaigle, C. De Vleeschouwer, B. Macq, "Digital watermarking," *Proceedings of the IS&T/SPIE Conference on Optical Security and Counterfeit Deterrence Techniques*, San Jose, CA, USA, Feb. 1-2, 1996, vol. 2659, pp. 99-110.

[6] F. M. Boland, J. J. K. Ó Ruanaidh and C. Dautzenberg, "Watermarking digital images for copyright protection," *Proceedings of the International Conference on Image Processing and its Applications*, Edinburgh, Scotland, July 1995, pp. 321-326.

[7] Mitchell D. Swanson, Bin Zhu and Ahmed H. Tewfik, "Transparent robust image watermarking," *Proceedings of the 1996 International Conference on Image Processing*, Lausanne, Switzerland, Sept. 16-19, 1996, vol. 3, pp. 211-214.

[8] C. I. Podilchuk and W. Zeng, "Digital image watermarking using visual models," *Proceedings of the IS&T/SPIE Conference on Human Vision and Electronic Imaging II*, San Jose, CA, USA, Feb. 10-13, 1997, vol. 3016, pp. 100-111.

[9] Fred Mintzer, Albert Cazes, Francis Giordano, Jack Lee, Karen Magerlein and Fabio Schiattarella, "Capturing and preparing images of Vatican library manuscripts for access via Internet," *Proceedings of the IS&T 48th Annual Conference*, Washington, DC, USA, May, 1995, pp. 74 - 77.

[10] James D. Murray and William VanRyper, *Encyclopedia of Graphics File Formats*, Second Ed., O'Reilly & Associates, Inc. 1996, pp. 429-450.

[11] Scott Craver, Nasir Memon, Boon-Lock Yeo and Minerva Yeung, "Can invisible watermarks resolve rightful ownerships?", *Proceedings of the IS&T/SPIE Conference on Storage and Retrieval for Image and Video Databases V*, San Jose, CA, USA, Feb. 13-14, 1997, vol. 3022, pp. 310-321.

[12] Bruce Schneier, *Applied Cryptography*, Second Ed., Wiley & Sons, 1996.

−26−
Figure 1. Original canyon image
Figure 2. Watermarked canyon image
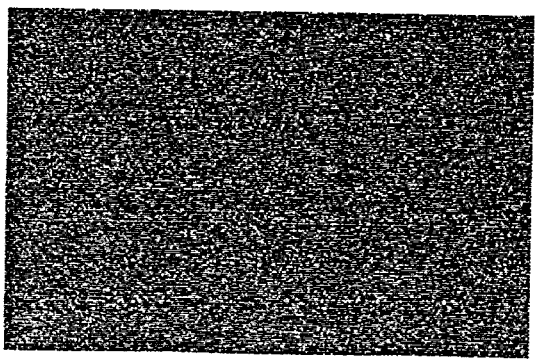
Figure 3. $W_1$ for canyon image 3220-29056
-27-
Figure 4. Original Tia picture
Figure 6. Tia watermarked with $W_1$ and $W_2$
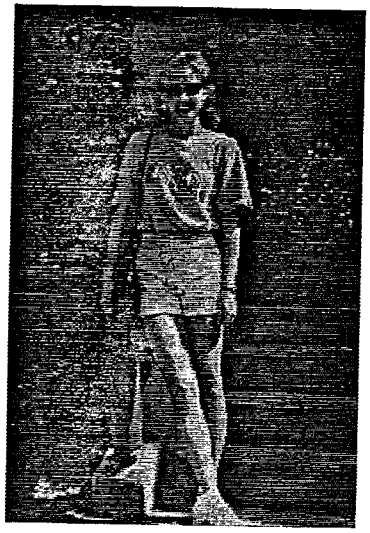
Figure 5. Watermarked picture of Tia
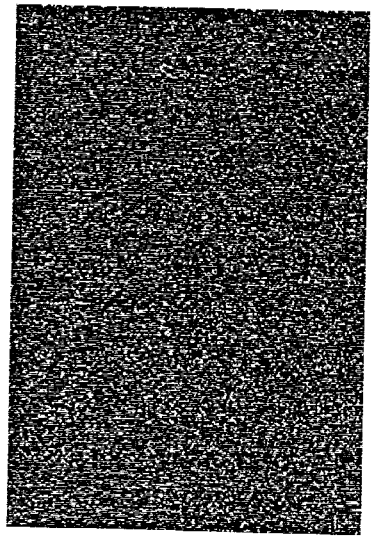
Figure 7. $W_1$ for Tia picture

Figure 8. Unwatermarked glass GIF image
Figure 9. Watermarked glass GIF image

What is claimed is:

1. A method of determining if at least a portion of a suspect signal is derived from a watermarked original signal comprising the steps of:
   providing a watermark;
   creating the watermarked original signal by incorporating the watermark onto an original signal;
   generating at least one first watermark indicator based on the watermarked original signal and the watermark;
   generating at least one second watermark indicator based on the suspect signal and the watermark; and
   determining a degree of authenticity of the suspect signal based on the at least one first watermark indicator and the at least one second watermark indicator.

2. The method of claim 1 wherein the watermark is visually imperceptible after incorporation onto the original signal.

3. The method of claim 1 wherein the original signal is a digital signal.

4. The method of claim 3 wherein the original signal is selected from the group comprising digital images, digital audio, and digital video.

5. The method of claim 1 wherein the step of providing a watermark comprises providing a watermark that is substantially random.

6. The method of claim 5 wherein the original signal is a digital signal and the step of providing a watermark comprises creating a watermark based on an m-sequence.

7. The method of claim 6 wherein the length of the m-sequence is greater than the length of the digital signal.

8. The method of claim 7 wherein the watermark is based on a plurality of non-adjacent sections from the m-sequence.

9. The method of claim 1 wherein the original signal is a digital image comprising a plurality of planes and the step of creating the watermarked original signal comprises incorporating at least a portion of the watermark onto at least one plane of the digital image.

10. The method of claim 9 wherein the step of providing a watermark comprises providing a separate watermark for each plane of the digital image.

11. The method of claim 10 wherein a first watermark is provided for a first plane of the digital image and successive watermarks for successive planes of the digital image are generated based on the first watermark.

12. The method of claim 9 wherein the step of providing a watermark comprises providing a watermark having portions corresponding to each of the plurality of planes.

13. The method of claim 1 wherein the step of generating at least one first watermark indicator comprises comparing at least a portion of the watermarked original signal to a corresponding portion of the watermark.

14. The method of claim 13 wherein the step of generating at least one second watermark indicator comprises comparing at least a portion of the suspect signal to a corresponding portion of the watermark.

15. The method of claim 1 wherein the original signal is a digital signal and the step of generating at least one first watermark indicator comprises computing at least one first cross-correlation value based on a portion of the watermarked original signal and a corresponding portion of the watermark.

16. The method of claim 15 wherein the suspect signal is a digital signal and the step of generating at least one second watermark indicator comprises computing at least one second cross-correlation value based on a portion of the suspect signal and a corresponding portion of the watermark.

17. The method of claim 16 wherein the step of determining if at least a portion of the suspect signal is derived from the watermarked original signal comprises comparing the difference between the at least one second cross-correlation value and the at least one first cross-correlation value to at least one threshold.

18. The method of claim 17 wherein the value of the threshold is based on the size of the portion of the watermarked original signal used in computing the at least one first watermark indicator.

19. The method of claim 1 wherein the original signal and suspect signal each comprise an array of pixel values and the watermark is a digital watermark having values that correspond to changes in the pixel values of the original and suspect signals.

20. The method of claim 19 wherein each of the arrays of pixel values includes a plurality of sub-arrays of pixel values and the step of generating at least one first watermark indicator includes computing a first plurality of cross-correlation values based on each of the plurality of sub-arrays of pixel values of the watermarked original signal and the watermark.

21. The method of claim 20 wherein the step of generating at least one second watermark indicator comprises computing a second plurality of cross-correlation values for each of the plurality of sub-arrays of pixel values of the suspect signal and the watermark.

22. The method of claim 21 wherein the step of determining if at least a portion of the suspect signal is derived from the watermarked original signal comprises subtracting at least one of the second plurality of cross-correlation values from at least one of the first plurality of cross-correlation values and comparing the at least one difference to at least one threshold value.

23. The method of claim 22 wherein the at least one threshold value is based on the number of values used in computing the at least one difference.

24. The method of claim 1 wherein the suspect signal is a digital signal generated by digitizing an original suspect signal.

25. The method of claim 24 wherein the suspect signal is generated by scanning an image.

26. The method of claim 1 wherein the step of providing a watermark comprises providing a first portion of the watermark having a first range of values and a second portion of the watermark having a second range of values.

27. The method of claim 1 wherein the steps of providing a watermark and creating the watermarked original signal by incorporating the watermark onto an original signal comprise deriving a watermark that exists within the original signal so that the original signal is the same as the watermarked original signal.

28. The method of claim 27 wherein the step of deriving a watermark that exists within the original signal comprises the steps of providing a value, determining locations in the original signal that represent the value, and deriving a watermark that exists within the original signal based on the determined locations.

29. The method of claim 1 wherein the original signal includes a second watermark and the step of determining if at least a portion of the suspect signal is derived from the watermarked original signal further comprises determining if the suspect signal contains the second watermark.

30. The method of claim 1 wherein the step of generating at least one first watermark indicator comprises transforming the watermarked original signal into another domain.

31. The method of claim 1 wherein the step of generating at least one second watermark indicator comprises transforming the suspect signal into another domain.

32. A method of determining if a second signal is derived from a first signal comprising the steps of:
generating at least one first watermark indicator based on the first signal and a watermark;
generating at least one second watermark indicator based on the second signal and the watermark; and
deriving an overall indicator indicating a degree of authenticity of the second signal based on the at least one first and at least one second watermark indicators, and determining if at least a portion of the suspect signal is derived from a portion of the original signal based on the overall indicator.

33. The method of claim 32 wherein the first signal has a watermark incorporated therein.

34. The method of claim 32 wherein the watermark is derived based on information in the first signal.

35. The method of claim 32 wherein the first and second signals are digital signals.

36. The method of claim 32 wherein the at least one first watermark indicator is based on cross-correlation between the first signal and the watermark, and the at least one second watermark indicator is based on cross-correlation between the second signal and the watermark.

37. The method of claim 36 wherein the step of determining if the second signal is derived from the first signal comprises subtracting at least one of the at least one first watermark indicator from at least one of the at least one second watermark indicator and comparing the at least one difference to at least one threshold.

38. The method of claim 32 wherein the overall indicator is compared to a plurality of thresholds to indicate a degree of authenticity of the second signal.

* * * * *